United States Patent [19]
Katraro et al.

[11] Patent Number: 5,676,832
[45] Date of Patent: Oct. 14, 1997

[54] MULTI-STAGE MEMBRANE SYSTEM AND PROCESS

[75] Inventors: Reuven Katraro, Rishon Letzion; Charles Linder, Rehovot; Mara Nemas, Gedera, all of Israel

[73] Assignee: Membrane Products Kiryat Weisman, Ltd., Israel

[21] Appl. No.: 745,050

[22] Filed: Nov. 7, 1996

[30] Foreign Application Priority Data

Nov. 5, 1995 [IL] Israel ......................... 115941

[51] Int. Cl.$^6$ ................................. B01D 15/08
[52] U.S. Cl. ................... 210/198.2; 210/195.2; 210/259; 210/659
[58] Field of Search ....................... 210/635, 656, 210/659, 641, 652, 653, 195.2, 198.2, 259

[56] References Cited

U.S. PATENT DOCUMENTS

| | | | |
|---|---|---|---|
| 4,448,691 | 5/1984 | Davis | 210/656 |
| 4,957,620 | 9/1990 | Cussler | 210/635 |
| 5,160,625 | 11/1992 | Jonsson | 210/198.2 |
| 5,160,627 | 11/1992 | Cussler | 210/639 |
| 5,279,972 | 1/1994 | Heckenberg | 210/656 |
| 5,434,298 | 7/1995 | Negawa | 210/659 |
| 5,434,299 | 7/1995 | Negawa | 210/659 |
| 5,498,752 | 3/1996 | Negawa | 210/198.2 |
| 5,578,204 | 11/1996 | Bartholmes | 210/198.2 |

*Primary Examiner*—Ernest G. Therkorn
*Attorney, Agent, or Firm*—Laubscher & Laubscher

[57] ABSTRACT

The invention provides a multistage membrane system for the recovery of solvents and solutes from chromatographic systems, including first means for directing a first fluid stream of a main eluting fraction, containing target molecules to be concentrated and solvent, to a first filtration membrane unit for concentration and recovery of the target molecules at the feed side of the first membrane; second means for directing fluid streams of other eluting fractions of the chromatographic process, containing contaminants and solvent, to a second filtration membrane unit for concentration and collection of the contaminant solutes at the feed side of the second membrane unit; and third means for directing filtered solvent coming from the permeate side of the first filtration unit to the feed side of the second filtration membrane unit, whereby the filtered solvent intermixes with the fluid stream of other eluting fractions.

8 Claims, 2 Drawing Sheets

MULTI-STAGE MEMBRANE SYSTEM AND PROCESS

FIELD OF THE INVENTION

The present invention relates to a multistage membrane system and process for concentrating valuable solutes, and purifying spent solvents, generated in chromatographic processes, especially preparative HPLC.

BACKGROUND OF THE INVENTION

In the chemical, food and especially pharmaceutical industries, preparative HPLC is one method of choice in the separation and purification of biologically active molecules. These molecules may range from low molecular species (50–500 da) to intermediate molecules (500 to 2000 da) and high molecular weight biopolymers such as polysaccharides, polypeptides or nucleotides. The value of the products may vary from 5 USD to 10,000 USD/Kilogram.

Chromatography is a process wherein a chromatographic column or chromatographic bed is loaded with a sample to be purified, and then solvent is passed through the column. The eluting solvent fractions are collected, and these fractions may be classified as an eluent stream containing the purified target compound, and eluent streams containing impurities that elute before and after the eluent with the target compound.

In this context various objectives sought to be solved by the present invention include: various aspects and embodiments of a) to concentrate further the target compound that normally elutes at less than 5% concentration and to recover the solvent in this stream for reuse;

b) to purify the solvents from the contaminated eluent streams that elute before and after the eluent with the target compound, and thus to reuse these solvents in the same or different processes;

c) to provide subsystems which concentrate the target molecules and recovers the solvent for reuse in the same operational run; and d) to provide a system wherein the chromatography elution mixtures are composed of a given ratio, these mixtures are recovered in the same ratio of solvents. This is important because chromatography systems are optimized to run at a given eluent composition, and the target molecules are also the most stable at these compositions. Thus, the recovered solvents can be used with adjustment, saving time, solvents and thus, money.

SUMMARY OF THE INVENTION

With these objects in mind, the present invention provides a multi-stage membrane system for the recovery of solvents and solutes from chromatographic systems comprising a) first means for directing a first fluid stream of a main eluting fraction, containing target molecules to be concentrated and solvent, to a first filtration membrane unit for concentration and recovery of said target molecular at the feed side of said first membrane;

b) second means for directing fluid streams of other eluting fractions of the chromatographic process, containing contaminants and solvent, to a second filtration membrane unit for concentration and collection of said contaminant solutes at the feed side of said second membrane unit; and c) third means for directing filtered solvent coming from the permeate side of said first filtration membrane unit to the feed side of said second filtration membrane unit, whereby said filtered solvent intermixes with said fluid stream of other eluting fraction to dilute the same and enhance their filtration by said second membrane.

In preferred embodiments of the present invention said system further comprises fourth means for directing filtered solvent coming from the permeate side of said second filtration membrane unit for recycling to the chromatographic HPLC system.

The present system processes the solvent streams coming from an HPLC column, including at least one stream with the target molecule that was purified by the HPLC, and at least one stream of solvents containing impurities. The solvents from both types of stream are recovered continuously or semi-continuously or batch without changing the solvent composition, and may be reused. The invention answers the problems of preparative Chromatographic (especially HPLC) systems: How to economically and in a batch or in on-line modes 1) recover and reuse large quantities of solvents, preferably without changing solvent composition, 2) how to concentrate the dilute stream of the target compounds, and 3) how to use less solvent in an HPLC process by continuously purifying eluting streams by the membrane and returning the prified streams to the HPLC columns.

As described herein, the multi-stage membrane system contains two membrane subsystems. In one subsystem, designated "SelRO I", the target compound is concentrated and solvent purified by a membrane unit, and in the second subsystem, designated "SelRO II", the solvent streams containing chromatographic contaminants are also purified by another membrane unit. The two subsystems are connected by a flow of purified solvent from the first system to the second system, and the concentrated target molecule is taken from "SelRO I", while the purified solvent is taken from "SelRO II". Each subsystem contains at least one membrane unit which may contain membrane elements in parallel, but more than one membrane unit may be connected in series, in order to achieve the necessary solvent purity and target molecule recovery.

In a first preferred embodiment of the present invention, said membranes are nano filtration (NF) membranes with a cut-off of between 80 to 150 daltons.

In a second preferred embodiment of the present invention, said membranes are nano filtration (NF) membranes having a cutoff of between 150 to 400 daltons.

In a third preferred embodiment of the present invention, said membranes are nano filtration (NF) membranes having a cutoff between 400 to 5000 daltons.

Preferably, said nanofiltration (NF) membranes are solvent resistant.

Especially preferred are nano filtration (NF) membranes in a configuration selected from spirals, tubular, tublets, and hollow fibers.

As will be described hereinafter, said membranes may be supported asymmetric membranes, treated by modification or by coating to convert them into nanofiltration membranes.

The invention also provides a process for the recovery of solvents and solutes from chromatographic systems comprising:

a) directing a first fluid stream of a main eluting fraction, containing target molecules to be concentrated and solvent, to a first filtration membrane unit for concentration and recovery of said target molecules at the feed side of said first membrane;

b) directing fluid streams of other eluting fractions of the chromatographic process, containing contaminants and solvent, to a second filtration membrane unit for concentration and collection of said contaminant solutes at the feed side of said second membrane unit; and c) directing filtered solvent coming from the permeate side of said first filtration membrane unit to the feed side of said second filtration membrane unit, whereby said filtered solvent intermixes with said fluid stream of other eluting fractions to 1) dilute the same and enhance their filtration by said second membrane, and/or 2) recover the eluting solvents from all streams in one stream for reuse.

In one preferred mode the membrane system processes the solvent streams directly as they come from the chromatography columns and returns the purified solvents to the columns continuously. In another mode of operation the HPLC or chromatography is operated and the solvent fractions collected on one day and purified by the membrane system on the same or another day without using the solvents immediately for the chromotography. In a third mode of operation, as the membrane system is used to purify solvents, the solvents are collected from a previous chromatography run and the output is used to operate on line a current chromatography run.

Even though chromatography is a batch processes, the rapidity of sample injection and eluent generation may be high enough to appear as a continuous process for downstream operations that must further purify and recover the solvent.

Thus in the present invention the target molecule concentration and solvent recovery may, from the point of view of the HPLC operation, be processed by the invented system in either a batch, or semi-continuously or continuously, but preferrably continuously and on line with the chromatographic process.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

DETAILED DESCRIPTION OF PREFERRED EMBODIMENTS

Figure 1:
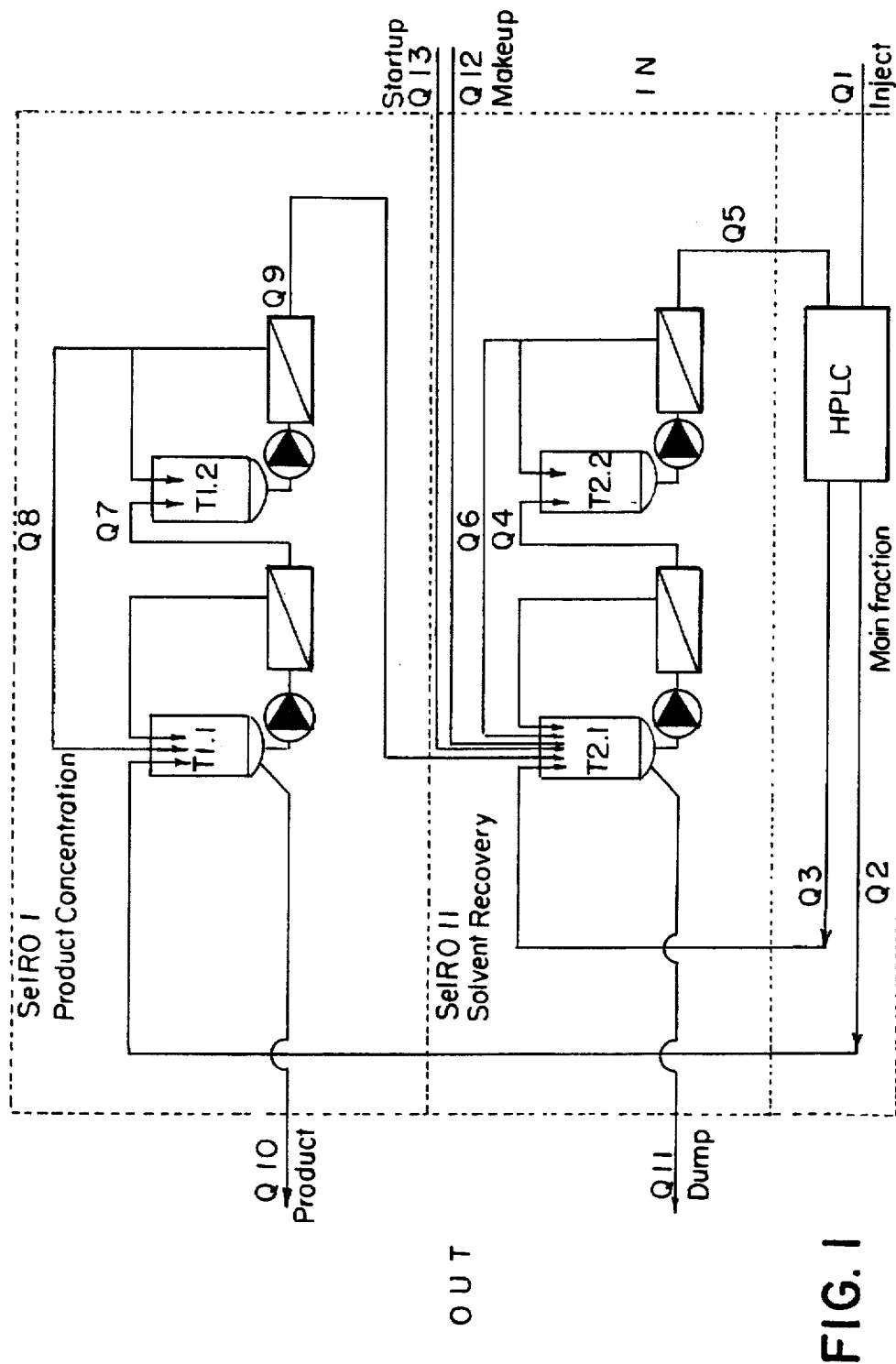
FIG. 1 is a schematic representation of a system.

Referring now to the figures in detail, one notes that FIG. 1 relates to a system, wherein the individual streams are treated simultaneously or on-line, and the solvent from each of the streams returned to the HPLC for reuse, and a concentrated stream of purified product produced, and taken from the system at the end of the run. The general system is shown in FIG. 1.

The sample is injected, Q1, together with an eluent stream Q5. The output of the HPLC are fractions of the solvent stream collected at different times, each containing different fractions of the injected material. The solvent fraction Q2, containing the target molecule is directed to a subsystem SelRO I of the invented system which concentrates the target molecule. This subsystem contains a holding tank before the first membrane unit, with the concentrate directed back to this first tank, and the permeate going to another tank which feeds into the second membrane unit, whose permeate is directed by path Q9 to the first tank of the solvent treating subsystem SelRO II, and the concentrate directed along Q8 to the first and second tanks of this subsystem SelRO I. A concentrate stream of purified target molecule is taken off from the first tank along Q10, usually at the end of the run, but not necessarily.

The streams containing impurities coming from the HPLC are directed along Q3, to the subsystem for purifying solvents from contaminants, combining the solvent coming from subsystem SelRO I along Q5 to the HPLC unit for reuse. Thus the stream containing the impurities is directed along Q3 to the first tank of subsystem SelRO II, then into the first membrane unit, the concentrate redirected to the same first tank, and the permeate along Q4 to a second tank, and then into a second membrane unit. The concentrate of this membrane unit is directed along Q6 to both the first and the second tanks of this subsystem and the permeate moves along Q5 to the HPLC. Provisions are made for adding make up solvents along path Q12. Provisions are also made to add a start up volume to the first Tank 2.1 in the solvent recovery subsystem, via Q13.

The quantity of membranes and associated tanks, flow and measurement devices used depends on the volume of solvent to be treated within the operating time. Thus in the product recovery subsystem to maintain an hourly flux across the membrane according to Q7 and Q9 may require, for example, one stage with one membrane element and tank at each stage. Similarly, for the solvent recovery subsystem to maintain flow rates as dictated by Q4 and Q5 may, for example, require a stage of three membrane elements for each stream.

The collected main fraction Q2, of the HPLC is placed in tank T1.1. The collected contaminated solvent Q3, is placed in T2.1. An additional quantity of solvent is added, equal to the quantity that is removed in Q10 (product removal), and Q11 (contaminate removal). This quantity added is composed of a portion which is added initially to tank T2.1 and is Q13 (startup volume) and an additional portion which is added during the process Q12 (makeup). The function of adding this quantity initially is in the case of continuous on-line operation with treatment of solutions as they come from the HPLC, is to have a quantity of solvent eluent that can be added immediately to the HPLC input through Q5, and in the case of a batch process which is operating on a previous days output to dilute the contaminate solution so that the recovered solvent destined for the HPLC unit will have a lower quantity of contaminant. During the running of the process additional solvent Q12 is added, so that Q1+Q12+Q13=Q10+Q11. (Q1 is the quantity which will be added to the HPLC when the sample is injected). For example Q10+Q11=800 liters, and Q13 is 300 liters, Q1 is 400 liters and the make-up quantity, Q12, added during the operation, is 100 liters.

In one mode of operation the solution in Tank T1.1 is pumped through the first NF stage, the concentrate is returned to T1.1, and the permeate goes along Q7 to Tank T1.2 and then into the second NF unit, where the concentrate is returned in part to T1.2, and in part to T1.1 along Q8. The instant ratio of concentrate going to Tank T1.1 and Tank T1.2 can be anywhere from 100% to 0%. In one mode all the concentrate is returned to T1.2 during the run. At the end of the run the solvent with product in T1.1 is pumped out to Q10 as the product. Then the quantity in T1.2 is pumped into T1.1 for the next run.

The permeate from the second NF module of the product concentration unit (SELRO 1 in FIG. 1 (7)) is led along Q9 to Tank T2.1 of the solvent recovery unit (SELRO 11 in FIG. 1). In T2.1 there may be a makeup solvent mixture plus a quantity Q3, depending on the mode of operation. The solvent for recovery is fed into the first NF unit.

The concentrate is returned to T2.1, and permeate Q4 into T2.2. The contents of T2.1 are pumped into the second NF stage, and the concentrate returned in part to T2.2 and T2.1. The instant ratio of concentrate going to Tank T2.1 and Tank T2.2 can be anywhere from 100% to 0%. In mode of operation all the concentrate goes to T2.2. At the end of the run the entire contents of T2.1 are pumped to Q11 and the contents of T2.2 are pumped to T2.1 for use in the next run. Thus the waste is taken off from Tank T2.1 along Q11, at the end of the run.

The required rejections of the membrane to the target molecule and contaminants depends on the following:

a) the allowable loss of the target molecule. This is related to the required volume concentration factor (the higher this is the more that is lost for a given rejection); and b) the required purity of the solvent for reuse.

Variations of the above are based on the principal that each subsystem of FIG. 1 has two membrane units to maximize the retention of solutes, to achieve an economical purification of solvent needed for reuse, and/or recovery of the target solute with minimal loss. These variations are:

1) With membranes of sufficiently high selectivity such as that first membrane units of each subsection can purify the solvent streams from the target molecule or the impurities, then the second tanks and second membrane units of each of the subsystems are not needed. By sufficiently high selectivity, one means that the solute is rejected to such an extent that the resultant permeate stream may be used directly in the HPLC. For the case of the concentration of the target molecule (in addition to recovering the solvent), the rejection must be high enough so that, during the concentration, the solute is not lost in any appreciable amount, as dictated by the economics of the processes and the product.

2) When the requirements of solvent purity are less than the requirements of target product loss, and when one membrane unit can meet the requirements of the former, but not the latter, then the second membrane and tank unit in subsystem B may be eliminated, but must be kept in subsystem SelRO I. (See, e.g., FIG. 2).

The membranes that may be used should, in addition to being solvent resistant, have molecular weight cutoffs of from 80 to 5000 daltons, and preferrably 100 to 1000 daltons. Membranes in this range are called nanofiltration membranes. Thus the membranes used in the present invention, for treating streams containing target molecules and contaminants in the above MW range, are taken from the class of solvent stable or resistant NF membranes. If the molecules to be rejected are larger than that treated by NF, then solvent stable ultrafiltration membranes may be used.

In another, but less preferred mode of operation, the present systems may operate on precollected fractions of HPLC eluent streams, and may not work simultaneously with the HPLC system.

The present system may be used to advantage especially in preparative HPLC systems in which large volumes of solvents must be used for the following reasons:

A) as an alternative to evaporation of solutions containing the target molecule. Thermal sensitive solutes may degrade in such a process, making this step inefficient because of product loss. In more mild concentrating procedures, such as vacuum distillation and lyophilization, the expense is great for large solvent volumes. NF remains the most cost effective way to concentrate and purify heat sensitive materials because the process does not require a phase change, and the temperature may be kept low.

B) Another important advantage using NF membranes is that the permeating solvent mixture has the same composition as the feed solvent. This is important because i) after the membrane process the rejected molecules remain in solution in a more concentrated form, but in a solute mixture of the same composition. This composition is often optimized to prevent denaturation, or precipitate or crystallize, as may happen if the solvent ratios change; and ii) it obviates the need for monitoring and adjusting of the solvent composition, which is essential for a reliable operation of the chromatographic process. The composition of the eluent is usually optimized to give rapid and selective separations.

C) Solvent recovery or waste disposal may account for 70% of the production costs in preparative HPLC. Purification of solvent streams with the present system using nanofiltration membranes can lower these costs.

Further concentration or purification of the product from this process, which is now in a concentrated form, can be purified by vacuum distillation, lyophilization, crystallization, or additional membrane process.

Because the selling price of the final product may be high, especially in the case of pharmaceuticals, the handling of thermally sensitive materials by NF may be economically more important than recycling of used solvents. Nevertheless the latter is important for many solvents and mixtures which are difficult to distill, and in general will become of increasing importance because of legislative environmental regulations which will be imposed on the industry. In addition, preparative HPLC requires large quantities of solvent. As these systems become larger increasing quantities of solvent are used, and without recycling the process becomes uneconomical.

Typical aqueous solvent streams contain 20 to 95% solvent such as:

Acetonitrile, acetone, methanol, ethanol, and sometimes pure solvents or solvent mixtures may be used.

Non-aqueous solvents and mixtures are also used, as for example, methylene chloride, hexane, methyl tertiary butyl ether, acetone, methyl ethyl ketone, tetrahydofuran, toluene, hexane and their mixtures.

The membrane system of the present invention may be used in the following areas: Antibiotics, Steroids, LMW and HMW peptides, hormones and hormone antagonists, prostaglandins, analgesics, cardivascular drugs, chemotherapy of neoplastic diseases, agents affecting renal function, and antimicrobial agents.

The present invention may also be used in the area of chiral or enantiomeric separations where chromatography columns are used to purify chiral compounds and/or resolve racemic mixtures. The recovery of solvents while generally very important, becomes critical for an economic process when using chiral solvents and when going to large scale.

Commercially available membranes which may be used for this application are NF membranes from Membrane Products Kiryat Weizmann (MPW). For example, for aqueous mixtures and polar solvents—MPF 44 membranes with a MW cutoff of 200 MW, and spiral or tubular elements of these membranes gives good performance.

For hydrophobic solvents and their mixtures, MPW's MPF 50 membranes and modules can be used for molecules with MW >600. Solution with solutes <600 MW, MPW's MPF 60 membrane should be used.

This invention is not limited to the above membranes, but it is given as an indication of the membranes which may be used. In addition, ceramic, glass, carbon and inorganic membranes may be used. Besides flat sheets and spiral elements, tubular and hollow fiber elements may be used.

The membranes are preferably asymmetric UF supports modified or coated to give nanofiltration (NF) membranes. In the case of flat sheets or tubular membranes, these are supported on woven and nonwoven materials consisting of polyolefins both homo-, co- and ter- polymers, polysulfones, polyetherketones, polyphenylene sulfides, polyamides, metal, ceramics, glass, carbonaceous, porous carbon, porous graphite and inorganics.

Aymmetric composites in a hollow fiber configuration or tublets need no further support and are therefor useful in the present system.

The arrangement of the membrane elements in the system may be:

A) in series, parallel, or a combination of both.

B) The elements may be further arranged symmetrically of truncated or pyrimidal arrangements.

EXAMPLE 1

A batch mode operation for a target pentaether molecule of MW 400 was carried out.

An HPLC column, LC-300, 300 mm. in diameter is used to purify a 5% solution of the pentaether molecule in the following way. Ten liters of a 14% solution (140 gr of crude compound), is injected (Q1) every 0.5 hrs., for 20 hrs. The total amount injected is 400 liters of a 14% solution. Together with this quantity, an eluting solvent mixture of 85%/15% MeOH/H20 (V:V) is passed through the column (Q5 in the figure), at a rate of 280 liters/hr, for a total of 5600 liters.

The output from the LC-30 is a product stream (Q2) at a rate of 65 liters per hour at a conc of 4.44% of the target molecule, and an eluent stream of 235 liters/hour at a concentration of contaminants of 0.34%.

From FIG. 1: Both Q2 and Q3 are collected during a 20 hour shift and treated the day after. The total amount of Q2 is 1300 liters, containing 4.4% product. The total mount of Q3 is 4700 liters, containing 0.34% contaminants.

Thus the process works by taking Q2 and Q3 streams, and with NF membranes removing Q10 of product and Q11 of a contaminated solvent strea, which is sent to the waste. This quantity that is removed (Q10 and Q11) is made up with an additional amount of pure solvent mixture Q13 and Q12 which is added during the process, so in the end the same eluting volume needed to operate the HPLC Q5, is available, and where Q10+Q11=Q1+Q12+Q13.

The product recovery subsystem is composed of a tank T1.1 of 2m3 and a tank T1.2 of 2m3, and two 4040 MPS 44 spiral wound elements, one at each stage. Each element contains 8 m² of membrane area.

The solvent recovery subsystem is composed of tank T2.1 of 5.02m2 and tank T2.2 of 5m3, and two 4040 MPS 44 spiral wound elements.

The quantity of membranes used depends on the volume of solvent to be treated within the operating time. In this case 20 hrs. Thus in the product recovery subsystem to maintain an hourly flux across the membrane according to Q7 and Q9 requires one stage with one 4040 element at each stage. Similarly, for the solvent recovery subsystem to maintain flow rates as dictated by Q4 and Q5, requires a stage of three 4040 elements in each membrane stage.

The collected main fraction Q2, 1300 liters, of the HPLC is placed in tank T1.1. The collected contaminated solvent Q3, 4700 liters, is placed in T2.1. An additional quantity of solvent is added equal to the quantity that is removed from Q10 (product removal), Q11 (contaminate removal). This quantity added is composed of a portion which is added initially to tank T2.1 and is Q13 (startup volume), and an additional portion which is added during the process Q12 (makeup). The function of adding this quantity initially is to dilute the contaminate solution so that the recovered solvent destined for the HPLC unit will have a lower quantity of contaminant. During the running of the process, additional solvent Q12 is added, so that Q1+Q12+Q13=Q10+Q11. (Q1 is the quantity which will be added to the HPLC when the sample is injected).

In operation the solution in Tank T1.1 is pumped through the first NF stage and the concentrate is returned to T1.1, and the permeate goes along Q7 to Tank T1.2 and then into the second NF unit, where the concentrate is returned in part to T1.2, and in part to T1.1 along Q8. In this example all the concentrate is returned to T1.2 during the run. At the end of the run the solvent with product in T1.1 is pumped out to Q10 as the product. Then the quantity in T1.2 is pumped into T1.1 for the next run.

The permeate from the second NF module of the product concentration unit (SELRO 1 in Figure), is led along Q9 to tank T2.1 of the solvent recovery unit (SELRO 11 in figure). In T2.1 there is 300 liters of a makeup solvent mixture, plus the quantity Q3 (4700 liters). The solvent for recovery is fed into the first NF unit (with 94% rejection to the contaminants and target molecules), whose concentrate is returned to T2.1, and permeate Q4 into T2.2. The contents of T2.1 are pumped into the second NF stage, and the concentrate returned in part to T2.2 and T2.1. The instant ratio of concentrate going to Tank T2.1 and Tank 2.2 can be anywhere from 100% to 0%. In this example all the concentrate goes to T2.2. At the end of the run the entire contents of T2.1 are pumped to Q11 and the contents of T2.2 are pumped to T2.1 for use in the next run. Thus the waste is taken off from Tank T2.1 along Q11, at the end of the run.

The product coming from the HPLC unit is 4.4% in 1300 liters. In this process it was concentrated to 14% in 400 liters, with a recovery of 98.91%. The recovered solvent had the same composition as the starting solvent—85/15 methanol/water.

The performance and operation of the unit is given in Table 1.

TABLE 1

Material balance for HPLC Product and Solvent Recovery
Solvent recovery SelRO II (full batch)
Rate = 280 ltr/hr., 20 hrs. per day
Reject. = 0.94

| Stream | | B Ltr/D | Contam. % | Contam. Gr. | Volume Check | Conc Check |
|---|---|---|---|---|---|---|
| Q3 | HPLC | 4700 | 0.3400 | 15980 | | |
| Q9 | Selrol | 940 | 0.0668 | 627 | | |
| Q12 | Makeup | 400 | 0.0000 | 0 | 6228 | 0.3029 |
| | Selro2 | 6040 | 0.2750 | 16607 | | |
| | Feed | 6228 | 0.3029 | 18865 | | |
| Q11 | conc1.1 | 439 | 3.6633 | 16090 | | |
| Q4 | perm1.2 | 5789 | 0.0479 | 2775 | | |

5,676,832

TABLE 1-continued

| Q6 | conc2.2 | 188.56 | 1.1983 | 2260 |
| Q5 | perm2.2 | 5600 | 0.0092 | 515 |
| Solvent recycling yield: | | | 93.33 | |
| Volume recycled: | | | 5600 | |
| Waste | | | | |
| Volume (Ltr): | | | 439.21 | |
| Concentration (%): | | | 3.66 | |

Product recovery  SelRO 1  (fully batch)
Rate = 45 ltr/hr. 20 hrs. per day
Reject. = 0.94

| Stream | | Volume Ltr/day | Product % | Product Gr | Volume Check | Conc Check |
|---|---|---|---|---|---|---|
| Q2 | HPLC | 1300.00 | 4.4444 | 57777 | | |
|  | Feed1.1 | 1404.43 | 4.4155 | 62012 | 1404.43 | 4.415475 |
| Q10 | conc1.1 | 360.11 | 15.8700 | 57150 | | |
| Q7 | perm1.1 | 1044.32 | 0.4656 | 4863 | | |
| Q8 | conc1.2 | 104.43 | 4.0554 | 4235 | | |
| Q9 | perm1.2 | 939.89 | 0.0668 | 627 | | |
| Product Recovery Yield: | | | | | 98.91% | |

Process Summary

|  |  | Ltr | % |  |  |
|---|---|---|---|---|---|
| INPUT | | | | | |
| Q1 | Injected | 400 | 14 | | |
| Q12 | Makeup solvent | 400 | 0 | | |
| OUTPUT | | | | | |
|  |  |  |  | Volume balance | |
| Q10 | Product | 360 | 15.87 | Q1 + Q12 = Q10 + Q11 | |
| Q11 | Contaminants | 439 | 3.66 | 800 | 799.32 |

EXAMPLE 2

A batch mode operation for a target pentaether molecule of MW 700 was carried out.

An HPLC column, LC-300, 300 mm. in diameter, is used to purify a 18% solution of the target compound in the following way: 5 liters of a 18% solution (90 gr of crude compound) is injected (Q1) every 0.5 hrs., for 20 hrs. The total amount injected is 100 liters of an 18% solution.

Together with this quantity, an eluting solvent mixture of 90%/10% MeOH/H20 (V:V) is passed through the column (Q4 in the FIG. 2), at a rate of 750 liters/Hr., for a total of 15,000 liters.

The output from the LC-30 is a product streatm (Q2) at a rate of 155 liters per hour at a conc of 0.5% of the target molecule, and an eluent stream of 600 liters/hour at a concentration of contaminants of 0.025%.

Both Q2 and Q3 are collected during a 20 hour shift and treated the day after. The total amount of Q2 is 3100 liters, containing 0.5% product. The total amount of Q3 is 12,000 liters, containing 0.025% contaminants.

Figure 2:
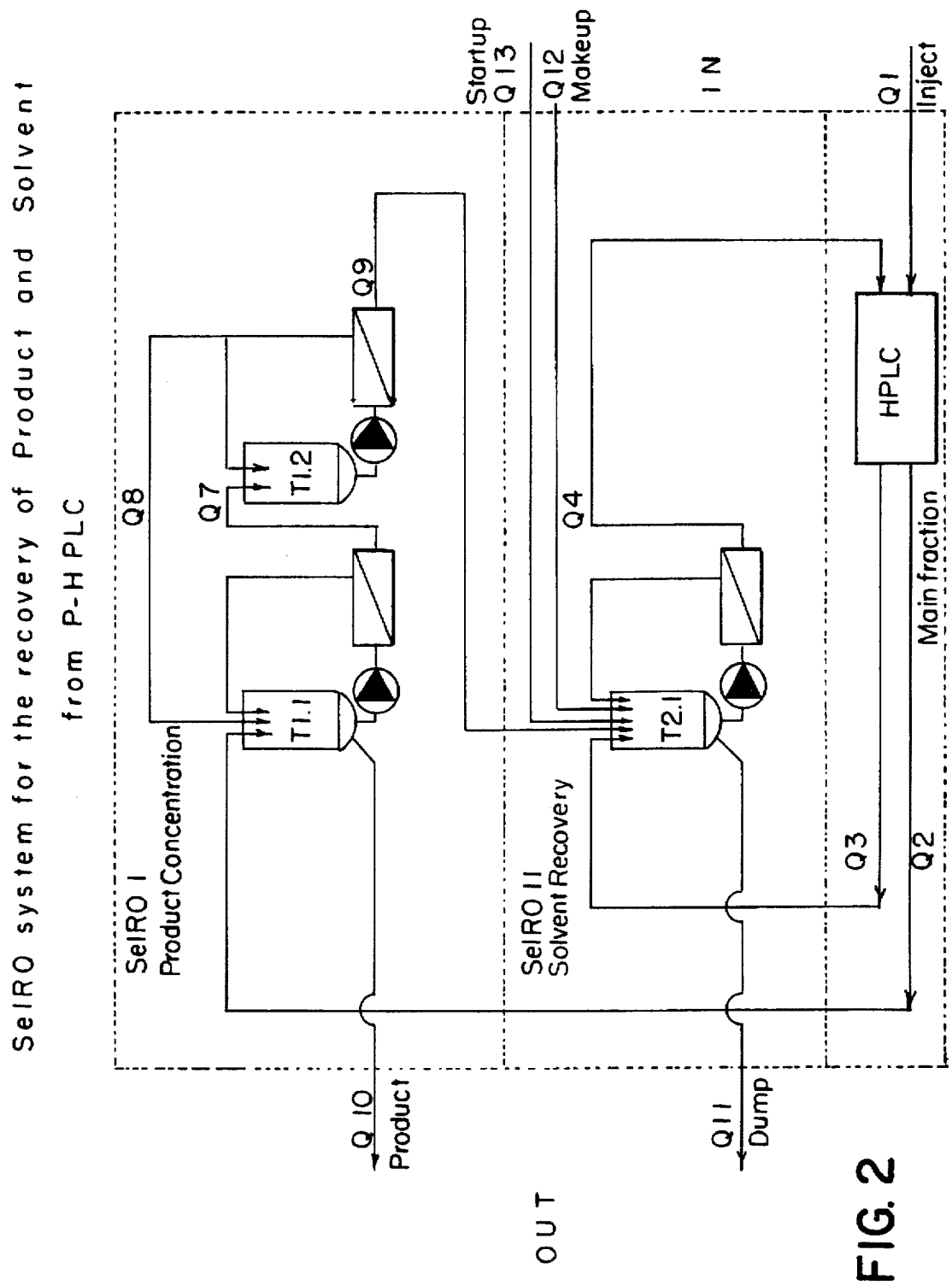
FIG. 2 is a schematic representation of a modification of the system of FIG. 1.

Both quantities are treated on a subsequent day by a system shown in FIG. 2. All the NF units are MPS 44 4040 size spirals, containing 6m2 of membrane area per spiral, and characterized by a water flux of 1000lmd and 98% rejection to a 5% sucrose molecule. The rejection to the target molecule is 98% and the flux to a 90/10 methanol/water solution is 81mh. at 30 atm, 30° C.

Thus the process works by taking Q2 and Q3 streams and with NF membranes, removing Q10 of product and Q11 of a contaminated solvent stream, which is sent to the waste. This quantity that is removed (Q10 and Q11), is made up with an additional amount of pure solvent mixture Q13 and Q12 which is added during the process, so in the end the same eluting volume needed to operate the HPLC Q4, is available, and where Q10+Q11=Q1+Q12+Q13.

The product recovery subsystem is composed of tanks T1.1 and T1.2 of 5m3 each and a tank T2.1 of 13m3, and two 4040 MPS 44 spiral wound units containing 4 elements (6m2 membrane area each) at one stage, and three elements (6m2 membrane area each) at the second stage.

The solvent recovery subsystem is composed of tank T2.1 of 31m3, and 15 spiral wound elements (6m2 membrane area each).

The quantity of membranes (described above), depends on the volume of solvent to be treated within the operating time, in this case 20 hrs. Thus in the product recovery subsystem to maintain an hourly flux across the membrane according to A7 and Q9, required one stage with four 4040 elements at one stage and three 4040 elements at the second stage. Similarly, for the solvent recovery subsystem to maintain flow rates as dictgated by Q4, requires a stage of 15 elements of MPS 44 4040 elements.

The collected main fraction Q2, 3100 liters of the HPLC is placed in tank T1.1. The collected contaminated solvent Q3, 12,000 liters, is placed in T2.1. An additional quantity of solvent is added, equal to the quantity that is removed in Q10 (product removal), Q11 (contaminate removal). This quantity added is composed of a portion which is added initially to tank T2.1 and is Q13 (startup volume), and an additional portion which is added during the process Q12 (makeup). The function of adding this quantity initially is to dilute the contaminate solution so that the recovered solvent destined for the HPLC unit will have a lower quantity of contaminant. During the. running of the process, addition solvent Q12 is added, so that Q1+Q12+Q13=Q10+Q11. (Q1 is the quantity which will be added to the HPLC when the sample is injected).

In this example Q10+Q11=150+220 liters=370 liters. Q13+Q12=270 liters, Q1 is 100 liters and Q1+Q13+Q12= 370 liters. In this example the startup volume was 100 liters and the remainder (Q12) was added later.

In operation, the solution in Tank T1.1 is pumped through the first NF stage and the concentrate is returned to T1.1, and the permeate goes along Q7 to Tank T1.2 and then into the second NF unit, where the concentrate is returned in part to T1.2, and in part to T1.1 along Q8.

The permeate from the second NF module of the product concentration unit (SELRO 1 in FIG. 2) is led along Q9 to tank T2.1 of the solvent recovery unit (SELRO 11 in Figure). In T2.1 there is 100 liters of a makeup solvent mixture, plus the quantity Q3 (12,000 liters). The solvent for recovery is fed into the NF unit (with 98% rejection to the contaminants and target molecules) whose concentrate is returned to T2.1, and permeate Q4 is the purified solvent mixture for HPLC use. At the end of the run the entire contents of T2.1 are pumped to Q11 as waste.

The quantity of solvent discarded to the waste Q11 is 220 liters, and the amount recovered is 15,000 liters. The recovered solvent had the same composition as the starting solvent 90/10 methanol/water.

The product coming from the HP1C unit is 0.5% in 3100 liters. In this process it was concentrated to 10.29% in 150 liters, with a recovery of 99%.

The performance and operation of the unit is given in Table 2.

TABLE 2

Material Balance for HPLC Product
and Solvent Recovery
Solvent recovery SelRO II (fully batch)
Rate = 750 ltr/hr, 20 hrs. per day
Reject. = 0.98

| Stream | | Rate Ltr | Contam. % | Contam. Gr. | Volume Check | Conc Check |
|---|---|---|---|---|---|---|
| Q3 | HPLC | 12000 | 0.0250 | 3000 | | |
| Q9 | Selrol | 2950 | 0.0018 | 53 | | |
| Q12 | Makeup | 270 | 0.0000 | 0 | 15220 | 0.0201 |
| | Selro2 | 15220 | 0.0201 | 3053 | | |
| | Feed | 15220 | 0.0201 | 3053 | | |
| Q11 | conc1 | 220 | 1.2770 | 2805 | | |
| Q4 | perm1 | 15000 | 0.0017 | 248 | | |
| Q6 | conc2.2 | 188.56 | 1.1983 | 2260 | | |
| Q5 | perm2.2 | 5600 | 0.0092 | 515 | | |
| Solvent recycling yield: | | | 98.20 | | | |
| Volume recycled: | | | 15000 | | | |
| Waste | | | | | | |
| Volume (Ltr): | | | 219.62 | | | |
| Concentration (%) | | | 1.28 | | | |

Product recovery SelRO 1 (fully batch)
Rate = 150 ltr/hr. 20 hrs. per day
Reject. = 0.98

| Stream | | Volume Ltr/day | Product % | Product Gr | Volume Check | Conc Check |
|---|---|---|---|---|---|---|
| Q2 | HPLC | 1300.00 | 0.5000 | 15500 | | |
| | Feed1.1 | 3302.05 | 0.4976 | 16432 | 3302.05 | 0.497644 |
| Q10 | conc1.1 | 150.09 | 10.2918 | 15447 | | |
| Q7 | perm1.1 | 3151.96 | 0.0313 | 985 | | |
| Q8 | conc1.2 | 202.05 | 0.4615 | 932 | | |
| Q9 | perm1.2 | 2949.91 | 0.0018 | 53 | | |
| Product Recovery Yield: | | | | | 99.66% | |

Process Summary

INPUT

| | | Ltr | % |
|---|---|---|---|
| Q1 | Injected | 100 | 18 |
| Q12 | Makeup solvent | 270 | 0 |

OUTPUT

| | | | | Volume balance | |
|---|---|---|---|---|---|
| Q10 | Product | 150.09 | 10.29 | Q1 + Q12 = Q10 + Q11 | |
| Q11 | Contaminants | 219.62 | 1.46 | 370 | 370 |

EXAMPLE 3

The procedure of Example 2 (FIG. 2) is run with the output of an HPLC, connected directly to the membrane system. In effect, Q2 contains the main fraction, with the target molecule exits the HPLC, and goes into tank T1.1, and Q3 from the HPLC goes into tank T2.1. Since Q2 is 155 liters/hr. the Tanks T1.1 and T1.2 can be 0.5m3, instead of 5m3 in the batch process, and since the hourly quantity of Q3 is 600 liters/hr., Tank 2.1 can be 1.0m3, instead of 13m3 in the batch process. The injection rate into the HPLC, Q1, in the continuous process, is the same as described in Example 2, 5 liters/hr. and the rate of addition of eluent is 750 liters/hr, also as in Example 2. The amount of start-up Q13 in T2.1 is 370 liters and Q12 (the make-up added during the process) is zero for the continuous case. In all other respects the system is operated as in the batch process in Example 2. Thus the benefit of a continuous process, wherein the output of is directly processed by the membrane system, is that the holding tanks can be considerably smaller, and the total volume of solvents present at each moment in the system is highly reduced. It will be evident to those skilled in the art that the invention is not limited to the details of the foregoing illustrative examples and that the present invention may be embodied in other specific forms without departing from the essential attributes thereof, and it is therefore desired that the present embodiments and examples be considered in all respects as illustrative and not restrictive, reference being made to the appended claims, rather than to the foregoing description, and all changes which come within the meaning and range of equivalency of the claims are therefore intended to be embraced therein.

What is claimed is:

1. A multistage membrane system for the recovery of solvents and solutes from chromatographic systems comprising:

a) first means directing a first fluid stream of a main eluting fraction from a chromatographic system, containing target molecules to be concentrated and solvent, to a first filtration membrane unit for concentration and recovery of said target molecules at the feed side of said first membrane;

b) second means directing fluid streams of eluting fractions of the chromatographic process other than the main eluting fraction, containing contaminants and solvent, to a second filtration membrane unit for concentration and collection of said contaminant solutes at the feed side of said second membrane unit; and c) third means directing filtered solvent coming from the permeate side of said first filtration membrane unit to the feed side of said second filtration membrane unit, whereby said filtered solvent intermixes with said fluid stream of eluting fractions other than the main eluting fraction.

2. A multistage membrane system according to claim 1, wherein further comprising fourth means for directing filtered solvent coming from the permeate side of said second filtration membrane unit for recycling to the chromatographic HPLC system.

3. A system according to claim 1, wherein the membranes are nanofiltration membranes with a cutoff of between 80 to 150 daltons.

4. A system according to claim 1, wherein the membranes are NF membranes have a cutoff of between 150 to 400 daltons.

5. A system according to claim 1, wherein the membranes have a cutoff between 400 to 5000 daltons.

6. A system according to claim 1, wherein the membranes are solvent resistant.

7. A system according to claim 1, wherein the membranes are in a configuration selected from spirals, tubular, tublets and hollow fibers.

8. A system according to claim 1, wherein the membranes are supported asymmetric membranes, treated by modification or coating them into nanofiltration membranes.

* * * * *